Patented Sept. 11, 1945

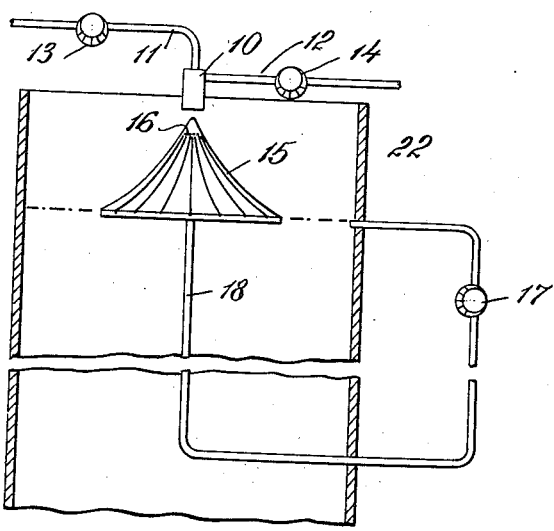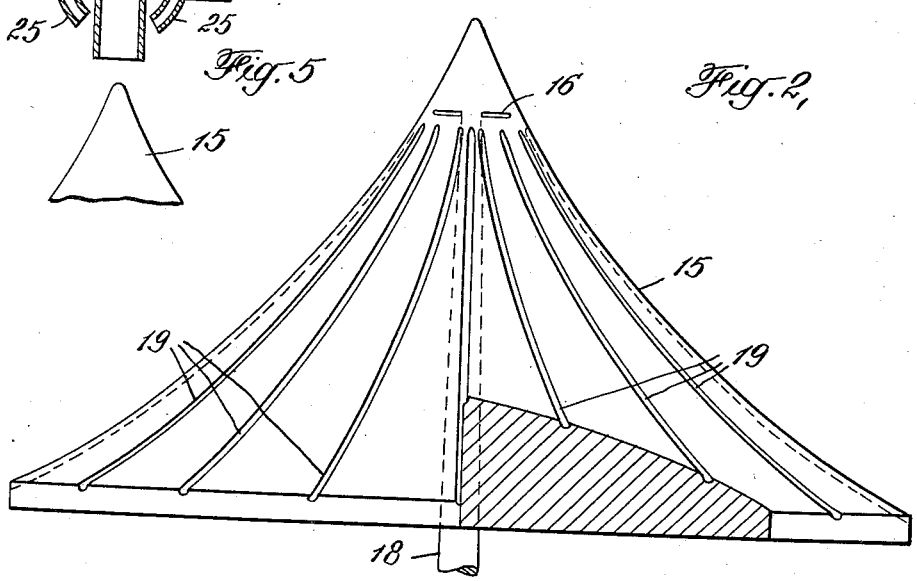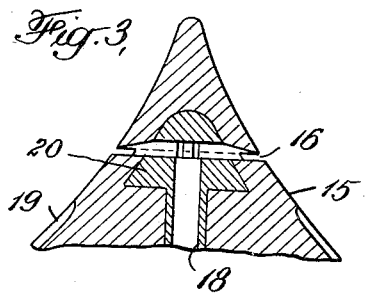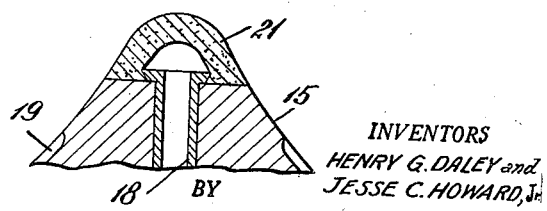

2,384,455

UNITED STATES PATENT OFFICE 2,384,455

APPARATUS AND PROCESS FOR MAKING CATALYTIC PARTICLES

Henry G. Daley, Woodbury Heights, and Jesse C. Howard, Jr., Woodbury, N. J., assignors to Socony-Vacuum Oil Company, Incorporated, a corporation of New York Application July 13, 1943, Serial No. 494,572

5 Claims. (Cl. 252—317)

This invention relates to a process and apparatus for forming adsorptive gel particles in spheroidal shape and adapted to function as a catalyst. More particularly, the invention is concerned with a novel means for subdividing a stream of inorganic hydrosol to be formed into spheroidal gel globules.

The apparatus of this invention is somewhat similar in nature to that of the prior copending application Serial No. 477,168, filed February 25, 1943, by John W. Payne, Edmund L. Sargent and Henry G. Daley. As described in that prior application, the functioning of means to supply a hydrosol to an oil bath is improved as to capacity and uniformity of operation by permitting the stream of hydrosol to flow onto the top of a conical divider having a plurality of grooves down its surface. The divider separates the stream of sol into a plurality of streams, each of which breaks up into globules of sol in the oil, the globules setting to firm elastic gel before passing out of the oil bath into a layer of water. In the said application it is disclosed that better operation is obtained if the surface of the divider is defined by a substance which is not wetted by water, for example, a wax. However, even the best apparatus of such type tends to accumulate gel mass on the divider, particularly when a sol of very short gelling time—say, 5 to 15 seconds—is used.

It has now been found that dividers of this type may be materially improved by causing a water-immiscible liquid to flow down the surface of the divider, for example, by interposing such liquid between the divider surface and the hydrosol. Preferably, that liquid is of such nature that it will wet the surface of the divider, thus forming a continuous film between the sol and the divider surface.

It is a primary object of this invention to provide means for improving the operation of dividers used to split a hydrosol stream. Other objects and advantages of the invention will appear from the discussion below of preferred embodiments shown in the attached drawing wherein:

Figure 1 is a fragmentary section of apparatus for forming hydrogel spheroids according to the present invention;

Figure 2 is an enlarged view in partial section of a divider according to this invention;

Figure 3 is a fragmentary section of the divider shown in Figure 2;

Figure 4 is a fragmentary section illustrating another embodiment of the invention; and Figure 5 is a fragmentary view of still another modification.

Referring now to Figure 1, a mixing nozzle 10 is adapted to prepare a suitable hydrosol by intimate admixture of reactant solutions, such as acid and water glass, supplied by pipes 11 and 12 from metering pumps 13 and 14. The hydrosol stream is discharged upon a divider 15 having its lower edge at or near the surface of a body of oil within a vessel 22.

The divider 15 may be of any desired form having a sloping surface with a plurality of grooves diverging downwardly from a point near the mixing nozzle 10 to the body of oil. Preferably, the nozzle is conical in shape, as illustrated, since this form gives the best subdivision of the stream. Near the apex of the cone 15, or other sloping surface, there is provided means for flowing a water-immiscible liquid, for example, slots 16. The cone is preferably formed of a substance which is not wetted by water but is wetted by the fluid discharged through the orifices 16. A very satisfactory expedient is to form the cone of paraffin wax and use a light petroleum fraction as the water-immiscible liquid in which the sol sets. This petroleum fraction, e. g., a gas oil, may be the same as that in which the globules set and thus may be circulated from the bath through a pump 17 and pipe 18 to emerge through orifices 16.

The details of the apparatus will be clear from Figures 2 and 3 which show the form of a conical divider in a preferred embodiment having a plurality of grooves 19 down the surface thereof. In actual practice, a large number of grooves are used but only a relatively few are shown in the figures, for ease of illustration. The divider itself may be a solid body of wax, or the like, formed on the pipe 18 which serves as a support thereof, as well as supplying oil to the orifices 16. As shown in Figure 3, the head of the pipe terminates in a cap 20 through which are formed passages for oil passing to the orifices 16.

According to an alternative embodiment shown in Figure 4, the oil or other water-immiscible fluid may be supplied to the surface of the divider 15 through a porous cap 21 communicating with and keyed to the pipe 18. In this case, oil supplied under pressure by pipe 18 seeps through the porous cap 21 to provide a film of oil over the cap 21 and down the surfaces of the divider 15.

In the embodiment of Figure 5, oil or other suitable liquid is supplied above the divider and flows thereto from above. A circular supply means 25, having means 26 to supply oil thereto, is disposed in annular relation to the mixing nozzle to furnish oil to the divider surface. The manner in which this expedient operates is not clearly understood, but it may be supposed that the oil preferentially wets the divider surface and thus forms a film to which gel will not adhere. It has been found that gelation on the divider is greatly reduced and occlusion of oil in the hydrogel spheres is so minor as to be unimportant.

We claim:

1. In apparatus of the class described, a conical divider, means to flow a hydrosol onto the apex thereof, a plurality of grooves diverging from a point adjacent the apex of said cone to the lower edge thereof and means to interpose a liquid between said divider and the hydrosol flowing thereover, comprising openings through the divider near the apex thereof and means to supply a liquid to said openings.

2. In apparatus of the class described, a conical divider, means to flow a hydrosol onto the apex thereof, a plurality of grooves diverging from a point adjacent the apex of said cone to the lower edge thereof and means to interpose a liquid between said divider and the hydrosol flowing thereover comprising a conduit coaxial with said divider communicating with the surface thereof near the apex and means to supply a liquid to said conduit.

3. In apparatus of the class described, a conical divider, means to flow a hydrosol onto the apex thereof, a plurality of grooves diverging from a point adjacent the apex of said cone to the lower edge thereof and means to interpose a liquid between said divider and the hydrosol flowing thereover comprising a porous cap on the apex of said divider and means to supply a liquid under pressure to the interior of said cap.

4. In a process for forming hydrogel globules by flowing a gelable hydrosol upon the apex of a conical divider; the improvement which comprises interposing a water-immiscible liquid which wets the surface of the divider between said hydrosol and said divider.

5. In a process for forming hydrogel globules by flowing a gelable hydrosol upon the apex of a conical wax divider; the improvement which comprises interposing a hydrocarbon oil between said hydrosol and said divider.

HENRY G. DALEY.
JESSE C. HOWARD, Jr.